Jan. 15, 1929. 1,699,022
J. RIEL
GRAB HOOK
Filed May 9, 1927
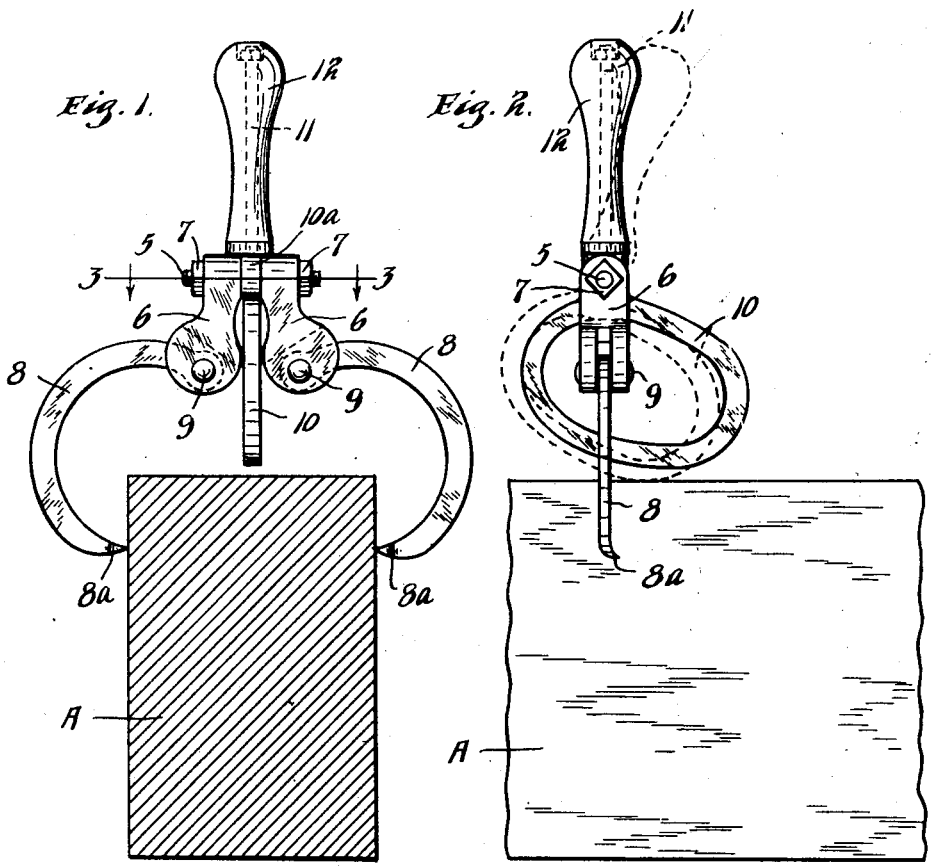
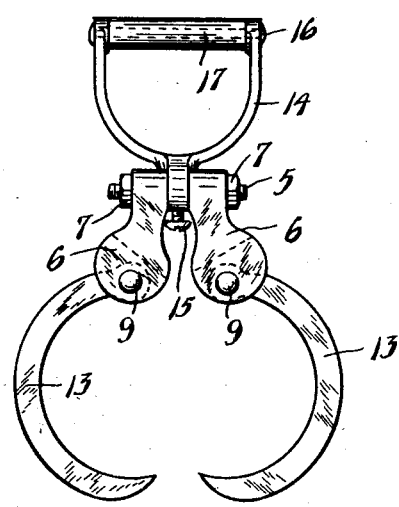
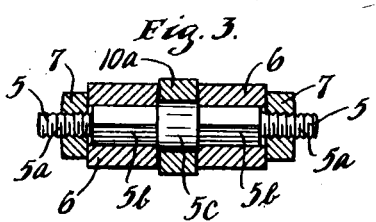
INVENTOR.
JOSEPH RIEL.
BY HIS ATTORNEYS.

Patented Jan. 15, 1929.

1,699,022

UNITED STATES PATENT OFFICE.

JOSEPH RIEL, OF MINNEAPOLIS, MINNESOTA, ASSIGNOR OF ONE-HALF TO JOSEPH DILLMAN, OF STRASBURG, NORTH DAKOTA.

GRABHOOK.

Application filed May 9, 1927. Serial No. 189,880.

This invention relates to grab hooks.

It is an object of this invention to provide an improved grab hook comprising a pair of tong-like members and a single handle grip for holding the device to operate the same.

It is another object of the invention to provide in combination with a pair of tongs adapted to engage the sides of an article, means for camming down on the upper surface of the article to prevent pivotal swinging movement of the article about the tong-like members in one direction.

It is a further object to provide means for readily releasing such a device from the article held thereby.

These and other objects and advantages of the invention will more fully appear from the following description made in connection with the accompanying drawings, wherein like reference characters refer to the same or similar parts throughout the various views and, in which, Fig. 1 is a view in front elevation of one embodiment of the present invention applied to an article;

Fig. 2 is a view in side elevation of the device illustrated in Fig. 1, certain of the parts being illustrated in full lines in one position and in dotted lines in another position;

Fig. 3 is a horizontal section taken on the line 3—3 of Fig. 1, as indicated by the arrows, and Fig. 4 is a view in front elevation of a modified form of the invention.

Referring to the drawings, Figs. 1, 2 and 3, the device consists generally of a head, a pair of hook arms pivoted to the head and adapted to engage, in a tong-like manner, opposite sides of an article to be held, a single handle grip and a cam attached to the handle grip and adapted to be swung to bear down on the top surface of an article held by the hook arms. The head consists of a stud 5, a pair of ears 6 and a pair of nuts 7, securing the ears on the stud. The stud 5 has threaded portions $5^a$ at each end thereof, squared portions $5^b$ inwardly from portions $5^a$ and a central cylindrical portion $5^c$. Ears 6 have squared holes extending through the upper portions and through which the squared portions $5^b$ of the stud 5 project. The cylindrical portion $5^c$ of stud 5 is of greater diameter than the diameters of the squared portions $5^b$ and, accordingly, shoulders are formed between the portions $5^b$ and the cylindrical portion $5^c$ against which the inner sides of the upper ends of the ears 6 abut. The ears are held on the stud 5 by means of the nuts 7 screwed on to the threaded portions $5^a$ of the stud. The ears project downwardly from their upper ends and are preferably cylindrically formed at their lower portions. Each of the ears 16 is centrally slotted at its lower edge to receive the upper end of one of the oppositely disposed and oppositely curved hook arms 8, the hook arms being respectively pivotally mounted in the lower portions of respective ears 6 on pivots 9 extending through the ears, and both hook arms being freely swingable in substantially the same plane, the upward and outward swinging movement of each hook arm being limited by the end of the slots formed in the ears 6. The lower ends of the hook arms 8 are pointed and are outwardly bent at $8^a$ in the same direction. An oval-shaped cam 10 is provided projecting downwardly between the two ears 6, the said cam being pivotally mounted on the cylindrical portion $5^c$ of stud 5 by an apertured ear $10^a$ formed integral with the cam adjacent one upper end thereof. Formed integral with the ear $10^a$ and projecting upwardly therefrom is a bolt 11 upon which a handle grip 12 is journaled.

In the device illustrated in Fig. 4, the construction is the same as that shown in Figs. 1, 2 and 3 and above described with the exception that hook arms 13 are substituted for the hook arms 8 and are similar in all respects to hook arms 8 except that they are made straight at their ends and not bent outwardly. Also in the construction illustrated in Fig. 4, the cam 10 is not used and another type of handle is substituted for the handle 12 and bolt 11. The handle construction used in Fig. 4 comprises a substantially Y-shaped bracket 14 having an opening at its lower end through which the cylindrical portion $5^c$ of stud 5 fits, a set screw 15 being provided for rigidly securing the bracket 14 to the stud 5. A pivot 16 extends through the upper ends of bracket 14 and has journaled thereon a grip portion 17.

The operation of the invention, although probably obvious, can be readily described. Referring to the device illustrated in Figs. 1, 2 and 3, the operator will grasp the handle grip 12 with one hand and will swing the device upwardly so that the hook arms 8 will extend upwardly and will fall by gravity until swung to their outermost position, the outer swinging movement thereof being limited by the ends of the slots formed in the ears 6. The device will then be rapidly swung downwardly by the operator in such manner that the hook arms 8 will embrace the sides of an article to be held as the article A and will be thrown against the sides of the article with considerable force so that the pointed ends 8ª of the hook arms will project into the sides of the article a short distance and will hold the article in tong-like manner. The handle 12 will then be swung from a substantially vertical position as illustrated in full lines Fig. 2, to a position substantially similar to that illustrated in dotted lines Fig. 2, thereby causing the cam 10 to bear down on the top surface of the article. By holding the cam 10 pressed downwardly on the top surface of the article in this manner, the pivotal swinging movement of the article about the points 8ª of the hook arms 8 will be prevented in one direction, provided that the article is stationary or that the right end of the article, as viewed in Fig. 2, is held. The left end of the article, as viewed in Fig. 2, can now be moved, swung or otherwise worked upon, the grab hook affording a convenient means for holding the left end of the article for such purposes. When now it is desired to detach the grab hook from the article, this may be readily done by simply moving the upper end of the handle 11 to the left, as viewed in Fig. 2, and at the same time jerking the handle to the left, thereby releasing cam 10 and jerking the pointed ends 8ª of the hook arms 8 out of engagement with the sides of the article. Due to the fact that the ends of the hook arms 8 are outwardly bent at 8ª from the main portions thereof, the device can be readily released from the article without the necessity of grasping each hook arm 8 and pulling the same apart.

One use of the device, which the inventor contemplates and wherein the device is particularly effective, is in the handling of railroad ties. These ties are of great weight and must be often carried from one place to another by workmen. The ties are usually carried on the shoulder of the workmen from place to place. One end of the tie is usually first placed against the shoulder of the workman, the other end resting on the ground. It then becomes necessary to pull the ground end of the tie upwardly so that the tie will balance in substantially a horizontal plane on the workman's shoulders. To do this has hitherto been very difficult. By use of the present device, the workman simply holds the grab hook of the present invention in one hand, raises the same upwardly and throws the hook arms downwardly over the sides of the tie, whereupon by moving the handle 12 towards his body, he may readily swing the ground end of the tie upwardly and arrange the same on his shoulder in horizontal position. When then he desires to drop his tie, he merely gives the handle a quick forward jerk, thereby releasing the device from the tie.

The chief use of the modification illustrated in Fig. 4, is as a pair of tongs for the handling of ice, bales of hay or similar articles. In this form of the device, the handle is formed rigidly with the head and the operator holding the device in one hand simply raises the same upwardly, causing the hook arms 13 to swing downwardly and then rapidly swings the handle downwardly causing the hooks 13 to be thrown into the sides of the article. There will be no necessity for pressing the two hook arms 13 together as is the case in the common type of ice tongs, and but one hand of the operator will be needed in engaging and lifting the article.

Both forms of the invention are of simple and easy construction and are efficient and simple in operation. It will, of course, be understood that various changes may be made in the form, details, arrangement and proportions of the various parts without departing from the scope of the present invention, which, generally stated, consists in the matter shown and described and set forth in the appended claims.

What is claimed is:

1. A grab hook comprising a stud having polygonal-shaped intermediate portions and a cylindrical central portion, a cam pivoted to said cylindrical portion and depending downwardly therefrom, ears mounted on said polygonal-shaped portions and extending downwardly therefrom, a pair of oppositely disposed hook arms pivoted at their upper ends in the lower ends of said ears and having pointed lower ends, and means secured to said cam for swinging the same in a plane normal to the plane of swinging movement of said arms.

2. A grab hook comprising, a head and a pair of hook arms pivoted in said head for opposite swinging movement in substantially the same plane, said arms having pointed lower ends facing each other, a cam extending between the upper ends of said arms and mounted for swinging movement in a plane substantially at right angles to the plane of movement of said arms, and a handle secured to said cam, whereby said grab hook can be held by said handle in upwardly raised position with the pointed ends of said hook arms spread apart and can then be swung rapidly downwardly to throw the pointed ends of said hook arms violently into opposite sides of an article, and the cam may be swung downwardly to bear against the top surface of the article and react against the pointed ends of said hook arms.

3. The structure defined in claim 2, the pointed lower ends of said hook arms being bent laterally in respect to the plane of swinging movement of said arms, whereby as the grab hook is swung downwardly from raised position, the direction in which said pointed ends project will correspond to the main line of force exerted on said arms and whereby said arms may be readily released from an engaged article.

In testimony whereof I affix my signature.

JOSEPH RIEL.